United States Patent [19]

Murakami

[11] Patent Number: 4,819,510
[45] Date of Patent: Apr. 11, 1989

[54] THREE-ELEMENT MULTI-STAGE TORQUE CONVERTER

[75] Inventor: Kiyoharu Murakami, Neyagawa, Japan

[73] Assignee: Kabushiki Kaisha Daikin Seisakusho, Osaka, Japan

[21] Appl. No.: 37,677

[22] Filed: Apr. 13, 1987

[30] Foreign Application Priority Data

Apr. 15, 1986 [JP] Japan .................... 61-86677

[51] Int. Cl.⁴ .................... F16H 47/08; F16H 57/10
[52] U.S. Cl. .................... 74/688; 74/759
[58] Field of Search .................... 74/688, 730, 759

[56] References Cited

U.S. PATENT DOCUMENTS

| | | | |
|---|---|---|---|
| 2,627,764 | 2/1953 | Mayner | 74/688 |
| 2,968,197 | 1/1961 | De Lorean | 74/688 |
| 3,339,431 | 9/1967 | Croswhite et al. | 74/688 |
| 3,425,295 | 2/1969 | Galaniuk | 74/688 |
| 3,575,067 | 4/1971 | Herman | 74/759 |
| 3,628,398 | 12/1971 | Chery | 74/688 |
| 3,722,323 | 3/1973 | Welch | 74/688 |
| 3,730,021 | 5/1973 | Stockton | 74/759 |

FOREIGN PATENT DOCUMENTS

| | | | |
|---|---|---|---|
| 0648290 | 9/1962 | Canada | 74/688 |
| 0138494 | 12/1959 | U.S.S.R. | 74/688 |
| 0670765 | 6/1979 | U.S.S.R. | 74/688 |
| 0408510 | 4/1934 | United Kingdom | 74/688 |
| 0680663 | 10/1952 | United Kingdom | 74/688 |

Primary Examiner—Dirk Wright
Assistant Examiner—Harold F. Macris
Attorney, Agent, or Firm—Armstrong, Nikaido, Marmelstein & Kubovcik

[57] ABSTRACT

A three-element multi-stage torque converter, wherein a planetary gear mechanism comprising a sun gear fixed to a turbine shaft, a planetary gear meshing with the sun gear, an internal gear fixed to a stator shaft and meshing with the planetary gear, and a planetary carrier which carries the planetary gear, is installed in a space formed by a housing and a pump impeller connected to the housing; and a cylindrical carrier shaft coaxial with the turbine shaft is fixed to the planetary carrier.

7 Claims, 3 Drawing Sheets

3. THREE-ELEMENT MULTI-STAGE TORQUE CONVERTER

BACKGROUND OF THE INVENTION 1. (Industrial useful field)

This invention relates to a three-element torque converter suitable mainly for a vehicle.

2. (Prior art)

In a conventional ordinary three-element single-stage two-phase torque converter, a torque ratio at time of low speed-ratio is increased by fixing a stator at time of low speed-ratio and by permitting it to rotate in a normal direction at time of high speed-ratio. However, the torque ratio is only about 3–3.5 in this case, which is not sufficient for ordinary application.

On the other hand, in a four-element two-stage torque converter, the stator is divided into two halves one half of which is rotated in a direction opposite to the other, and a reverse torque is combined with a turbine output to generate a high torque-ratio. In this case, however, its structure becomes complicated to cause a high cost to manufacture.

The inventor of the present invention has sought to provide a three-element torque converter which is able to increase a torque-ratio at time of low-speed range by the use of a planetary gear mechanism.

3. (Object of the invention)

An object of the invention is to provide a three-element multi-stage torque converter which is able to increase a torque-ratio at time of a low speed-ratio.

Summary of the Invention

A three-element torque converter, wherein a turbine wheel adapted to be rotated by a hydraulic power from a pump impeller and a stator wheel disposed therebetween are installed in a space formed by a housing to which an engine power is inputted and the pump impeller connected to the housing, an output side turbine shaft connected to said turbine wheel is disposed at a center, and a cylindrical stator shaft connected to the stator wheel is installed coaxially with the stator shaft; characterized by that a planetary gear mechanism comprising a sun gear fixed to the turbine shaft, a planetary gear meshing with the sun gear, an internal gear fixed to the stator shaft and meshing with the planetary gear, and a planetary carrier carrying the planetary gear, is provided in said space; and a cylindrical carrier shaft coaxial with the turbine shaft is fixed to the planetary carrier.

The engine power is inputted through the housing in the pump impeller. The turbine wheel is adapted to be rotated by a hydraulic power from the pump impeller. A torque of the turbine wheel is outputted from the turbine shaft. A hydraulic power received by the stator wheel is transmitted to the stator shaft.

The torque transmitted to the turbine shaft is transmitted to the sun gear. The torque of the stator shaft is transmitted to the internal gear. A revolution torque of the planetary gear is transmitted to the carrier shaft through the planetary carrier which carries the planetary gear in a rotating manner.

A torque-ratio at time of low speed-ratio can be increased by utilizing the outputs from the turbine shaft, the stator shaft and the carrier shaft which are constructed as mentioned above.

On the other hand, said planetary gear mechanism is installed in the space formed by the housing and the pump impeller so that the three-element multi-stage torque converter always maintains the multi-stage function regardless of a structure of transmission to be connected.

Therefore, the three-element multi-stage torque converter according to the present invention can be connected to various types of transmission. Namely, the torque converter has a large versatility.

DETAILED DESCRIPTION OF THE INVENTION (Embodiment)

Figure 1:
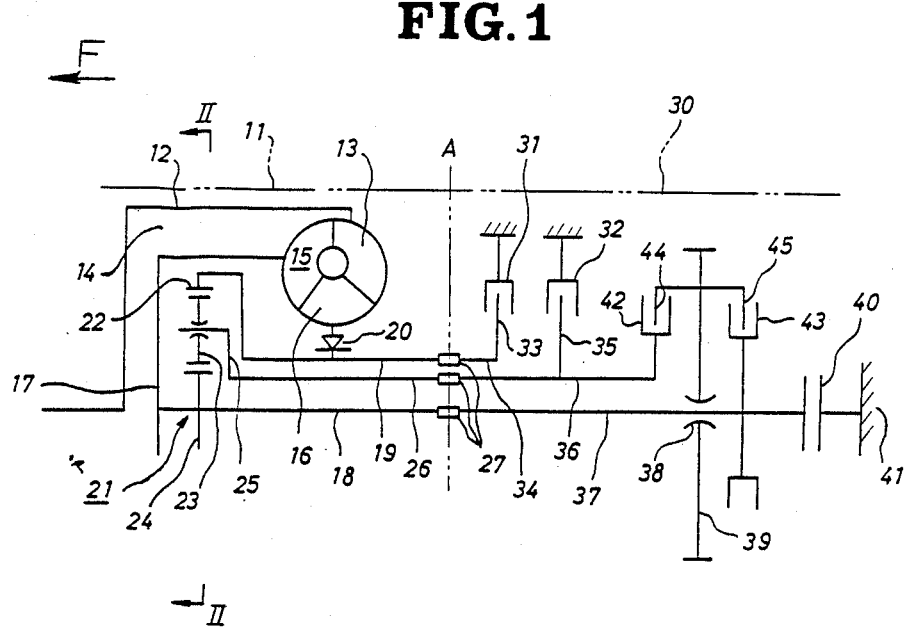
FIG. 1 a schematic structural diagram of a power transmission employing the torque converter according to the invention.

FIG. 1 shows the schematic structural diagram of transmission equipped with the three-element multi-stage torque converter for use in an automobile, for example, according to the present invention.

In FIG. 1 (arrow F showing a front side), a front portion of a housing 12 composing a torque converter 11 is connected to a not-shown engine. A coaxial pump impeller 13 is connected to a rear portion of the housing 12, and the housing 12 together with the pump impeller 13 form a space 14 which is approximately enclosed in an inside. A turbine wheel 15 adapted to be rotated by a hydraulic power from the pump impeller 13 is installed in the space 14 so as to face the pump impeller 13, and a stator wheel 16 is installed between the turbine wheel 15 and the pump impeller 13 coaxially therewith. The stator wheel 16 is so designed as to receive the hydraulic power from the pump impeller 13 and rotate (reverse direction) in a direction opposite to that (normal direction) of the pump impeller 13 in a low speed-ratio range.

An output side turbine shaft 18 which is connected through a connection part 17 to the turbine wheel 15, is installed in a central portion of the torque converter 11. A cylindrical stator shaft 19 interconnected to the stator wheel 16 is disposed coaxially with and spaced apart from the turbine shaft 18. A one-way clutch 20 transmitting only a reversal torque of the stator wheel 16 is interposed between the stator shaft 19 and the stator wheel 16.

Figure 2:
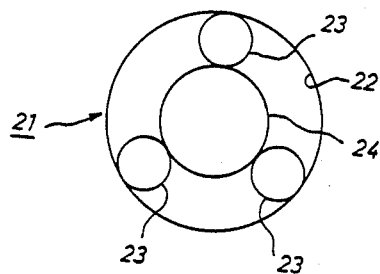
FIG. 2 is a partial sectional view taken on a line II—II of FIG. 1.

A planetary gear mechanism 21 is further disposed in the space 14. An internal gear 22 (number of teeth: $C_z$) of the planetary gear mechanism 21 is fixed to a front end of the stator shaft 19. The internal gear 22 meshes for example with three planetary gears 23 (FIG. 2). The planetary gear 23 is carried rotatably by a planetary carrier 25. The planetary gear 23 meshes further with a sun gear 24 (number of teeth:$A_z$), and the sun gear 24 is fixed to the turbine shaft 18.

A front end of a cylindrical carrier shaft 26 coaxial with the turbine shaft 18 is fixed to the planetary carrier 25. Couplings 27 for connecting to a transmission 30 are provided at rear ends of the turbine shaft 18, the stator shaft 19 and the carrier shaft 26 respectively. Such a coupling connected by a spline etc., its outer peripheral part being retained by a bearing, and a needle bearing or a metal being interposed between other shafts, is employed for the coupling 27.

A high-speed brake 31 and a low-speed brake 32 both being fixed to a housing of the transmission 30 are installed in the transmission 30. A front end of a cylindrical shaft 34 to which a disc brake 33 of the high-speed brake 31 is fixed, is connected to the coupling 27 of the stator shaft 19, and a cylindrical shaft 36 to which a disc brake 35 of the low-speed brake 32 is fixed, is connected to the coupling 27 of the carrier shaft 26. The high-speed brake 31 and the low-speed brake 32 are controlled by a not-shown well-known hydraulic circuit. As shown by the following Table 1; when the torque converter 11 is in a low-speed range, the low-speed brake 32 is changed to a locked mode and the high-speed brake 31 is changed to a released mode; and when the torque converter 11 is in a high-speed range, the low-speed brake 32 is changed to the released mode and the high-speed brake 31 is changed to the locked mode. Thereby, the torque ratio of the three-element torque converter which will become insufficient at the time of low-speed ratio can be increased.

TABLE 1

|  | High-speed brake | Low-speed brake |
|---|---|---|
| Low-speed range | Released | Locked |
| High-speed range | Locked | Released |

A main shaft 37 coaxial with the turbine shaft 18 is connected to the coupling 27 of the turbine shaft 18, and the cylindrical shafts 34 & 36 are disposed coaxially with and spaced apart from the main shaft 37. An output gear 39 carried rotatably by a bearing 38 is disposed at a midway of the main shaft 37. Further, the main shaft 37 extends in its rear direction and a backward brake 40 is provided at its rear end. The backward brake 40 is fixed to a housing 41 of the transmission 30. Clutch discs 44 & 45 for a first clutch 42 and a second clutch 43 are provided on the output gear 39, respectively. The first clutch 42 is fixed to a rear end of the cylindrical shaft 36, and the second clutch 43 is fixed to the main shaft 37. The output gear 39 is interconnected through a not-shown transmission system to a drive wheel.

The backward brake 40, the first clutch 42 and the second clutch 43 are controlled by a not-shown hydraulic circuit in the same manner as the high-speed brake 31 and the low-speed brake 32. As shown by the following Table 2, a speed change of forward two speeds and backward one speed is possible by locking or releasing a clutch or brake. In Table 2, the O mark represents the locked state and the X mark represents the released state.

TABLE 2

|  | Clutch | | Brake | | |
|---|---|---|---|---|---|
|  | 42 | 43 | 31 | 32 | 40 |
| Backward (R range) | O | X | X | X | O |
| 1st speed (low-speed range) | X | O | X | O | X |
| 2nd speed (high-speed range) | X | O | O | X | X |

Only upper halves of the torque converter 11, the planetary gear mechanism 21, the high-speed brake 31, the low-speed brake 32, the first clutch 42, the second clutch 43 etc. are illustrated in FIG. 1. However, they are practically formed into cylindrical shapes having their axes on the turbine shaft 18.

Function will be described hereinunder.

(Forward drive)

Firstly, in the low-speed range (low speed ratio), each brake and clutch are actuated as shown in Table 1 and Table 2. When the high-speed brake 31 is released and the low-speed brake is locked, the stator wheel 16 is rotated by the hydraulic power from the turbine wheel 15 in a direction opposite to a rotation direction (normal) of the turbine wheel 15.

The planetary carrier 25 is locked by the low-speed brake 32 and the planetary gear 23 is permitted to rotate, so that a stator torque Ts from the stator shaft 19 is combined with a turbine torque Tt from the turbine shaft 18 through the internal gear 22, the planetary gear 23 and the sun gear 24; thus being outputted through the coupling 27 to the main shaft 37.

Consequently, an output torque To at the time of low speed-ratio can be expressed by the following equation:

$$To = Ti + Ts + T \times Az/Cz \tag{1}$$

where To is the output torque, Ti is an input torque and Ts is the stator torque.

As compared with a case of a four-element torque converter wherein only a half of the stator torque Ts is combined, the output torque To obtained from the equation (1) is larger by the following value.

$$(\tfrac{1}{2}) Ts \times Az/Cz \tag{2}$$

Further, a torque ratio t is obtained by the following equation:

$$t = (Ti + Ts + Ts \times Az/Cz)/Ti \tag{3}$$

Accordingly, in case of Ti=1, Ts=1.5, Tt=2.5, Cz=60 and Az=40, for example; the torque ratio can be calculated as t=3.49 for the embodiment of FIG. 1, which is larger than a torque ratio of t=2.5 for the ordinary three-element torque converter or a torque ratio t=2.99 for the four-element torque converter.

Figure 6:
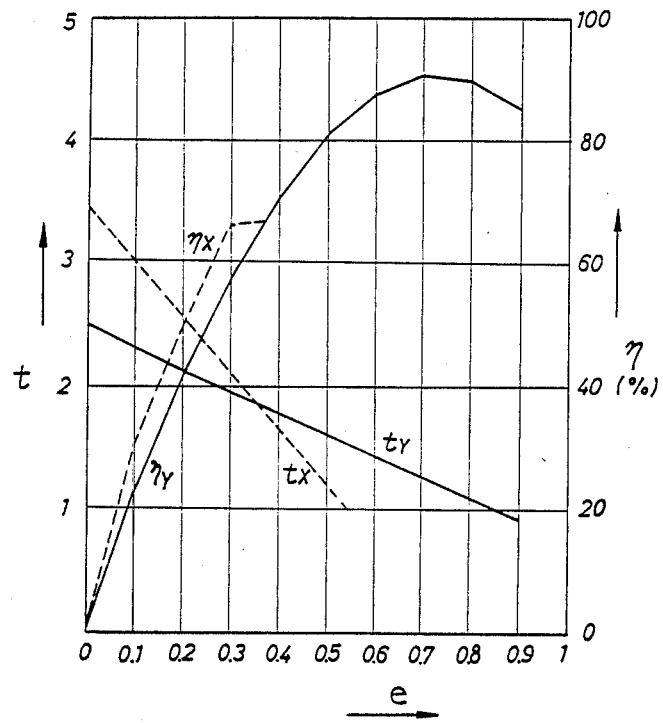
FIG. 6 is a graphical illustration showing a torque converter characteristic at time of low speed-ratio.

The foregoing torque converter characteristic in relation to speed-ratio e at the time of low speed-ratio developes a better efficiency ηx and a better torque ratio tx (broken lines) than an efficiency ηy and a torque ratio ty (solid lines) for the ordinary three-element torque converter as shown in FIG. 6.

At the time of foregoing low speed-ratio, a flow direction of working oil is not reversed at the stator wheel 16 so that flow resistance of working oil is small to cause a little heating.

Secondly, in the high-speed range, each brake and clutch are actuated as shown in Table 1 and Table 2. Since the high-speed brake 31 is locked and the low-speed brake 32 is released, the stator shaft 19 is locked and unable to rotate so that the torque converter characteristic similar to the ordinary three-element torque converter becomes obtainable.

Accordingly, an output torque To at the time of high speed-ratio can be calculated by the following equation:

$$To = Ti + Ts \tag{4}$$

and a torque ratio thereat can be calculated as follows:

$$t = (Ti + Ts)/Ti \tag{5}$$

(Backward drive)

In an R range at time of backward drive, the backward brake 40 is locked and the first clutch 42 is actuated. Thereby, an oil flow generated by the pump impeller 13 is reversed at the turbine wheel 15, and the stator wheel 16 rotates in a direction opposite to the rotation direction of the pump impeller 13. Utilizing the reversal torque of the backward drive, the drive torque can be increased owing to a speed reduction effect obtained by locking the sun gear 24, driving the internal gear 22 and bringing the planetary carrier 25 into the driven state.

In this instance, the speed reduction ratio can be expressed by the following equation:

$$(Az+Cz)/Cz$$

and calculated as 1.666.

Accordingly, a backward drive torque can be expressed by the following equation:

$$Ts \times (Az+Cz)/Cz = Ts \times 1.666$$

This torque is calculated as $Ts \times 1.666 = 1.5 \times 1.666 = 2.499$ which is approximately same as $To = Ti + Ts = 2.5$ for the ordinary three-element single-stage two-phase torque converter.

As described above, the speed change of forward two speeds and backward one speed can be accomplished by releasing or locking the backward brake 40, the first clutch 42, the second clutch 43, the low-speed brake 32 and the high-speed brake 31 as tabulated in the foregoing Table 2.

When assembling the transmission system, the already assembled torque converter 11 and transmission 30 are connected together by using the coupling 27. Namely, the torque converter 11 and the transmission 30 can be divided into two halves at a dividing line A. Therefore, the torque converter 11 can be easily applied to various transmissions 30 having different structures (including the following embodiments) so that transmission mechanisms having various characteristics are easily obtainable.

Since the planetary gear mechanism 21 is installed in the space 14 formed by the housing 12 and the pump impeller 13, the three-element multi-stage torque converter always maintains the multi-stage function regardless of the structure of transmission to be connected. For this reason, the three-element multi-stage torque converter according to the invention can be connected to various types of transmission while maintaining the multi-stage function so as to provide a large versatility.

(Another embodiment)

Figure 3:
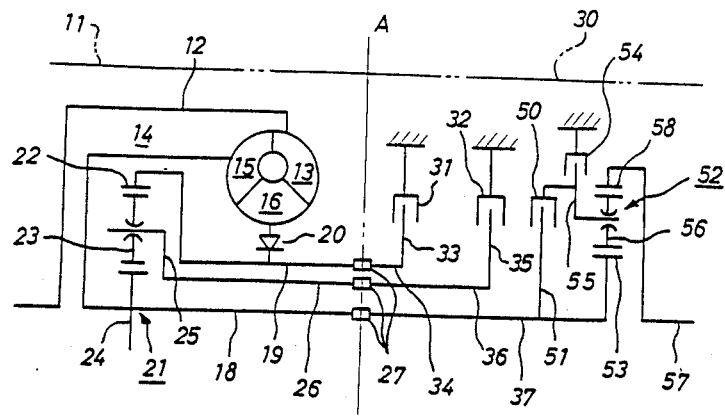
FIGS. 3, 4 and 5 are diagrams of another embodiments corresponding to FIG. 1.

(a) A structure as illustrated in FIG. 3 can be used, too. In FIG. 3, a member corresponding to that of FIG. 1 is attached with the same symbol as FIG. 1.

In FIG. 3, a clutch disc 51 of a clutch 50 and a sun gear 53 of a planetary gear mechanism 52 are fixed to the main shaft 37. The clutch 50 is fixed to a brake disc 55 of a brake 54, and the brake 54 is fixed to the housing of the transmission 30. Further, brake disc 55 rotatably retains a planetary gear 56 of the planetary gear mechanism 52. The planetary gear 56 meshes with the sun gear 53 and at the same time with an internal gear 58 fixed to an output shaft 57.

The clutch 50 and the brake 54 are controlled by a not-shown hydraulic circuit, and a speed change of forward two speeds and backward one speed is performed by changing an arbitral clutch or brake to the locked state as tabulated in the following Table 3. Incidentally, in Table 3, the O mark represents the locked state and the X mark represents the released state.

TABLE 3

| | Clutch | Brake | | |
|---|---|---|---|---|
| | 50 | 54 | 31 | 32 |
| Backward (low-speed range) | X | O | X | O |
| Backward (high-speed range) | X | O | O | X |
| Forward (low-speed range) | O | X | X | O |
| Forward (high-speed range) | O | X | O | X |

When assembling the transmission system, the already assembled torque converter 11 and the transmission 30 are connected together by using the coupling 27. Namely, the torque converter 11 and the transmission 30 can be divided into two halves at the dividing line A.

Figure 4:
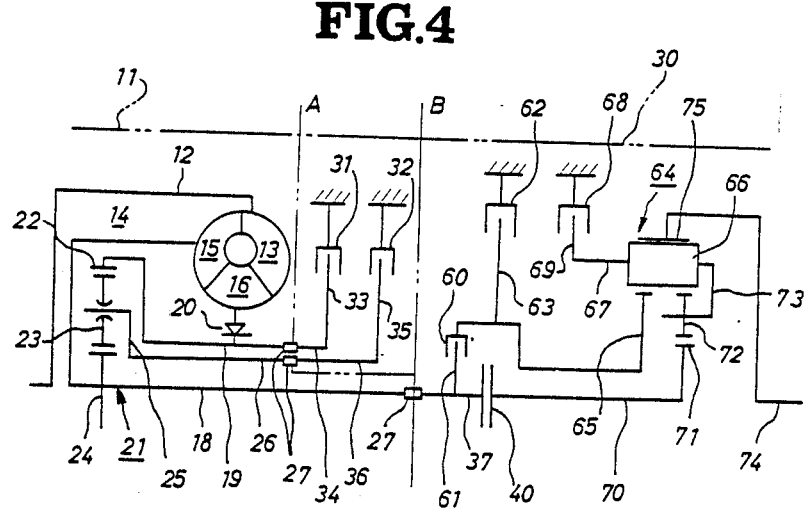

(b) A structure of FIG. 4 can be used, too. In FIG. 4, a member corresponding to that of FIG. 1 is attached with the same symbol as FIG. 1.

In FIG. 4, a clutch disc 61 of a front clutch 60 is fixed to the main shaft 37. The front clutch 60 is fixed to a brake disc 63 of a brake 62, and the brake 62 is fixed to the housing of the transmission 30. Further, the brake disc 63 is fixed further to a sun gear 65 of a Lavineaux compound gear mechanism 64. A planetary gear 66 of the havigneaux compound gear mechanism 64 is rotatably carried by a planetary carrier 67, and the planetary carrier 67 is fixed to a brake disc 69 of a brake 68. The brake 68 is fixed to the housing of the transmission 30.

While, the rear clutch 40 is fixed to a front end of a link shaft 70. A rear end of the link shaft 70 is fixed to a sun gear 71 of the lavigneaux compound gear mechanism 64. A planetary gear 72 meshes with the sun gear 71, and the planetary gear 72 is rotatably carried by a planetary carrier 73 fixed to the planetary carrier 67. The planetary gear 72 further meshes with the planetary gear 66, and the planetary gear 66 in turn meshes with an internal gear 75 of an output shaft 74.

When assembling the transmission system, the already assembled torque converter 11 and the transmission 30 are connected together by using the coupling 27. In this case, the division may be made at all the couplings 27 or at the coupling 27 between the turbine shaft 18 and the main shaft 37. Namely, the torque converter 11 and the transmission 30 can be divided into two halves at the dividing line A or B.

Figure 5:
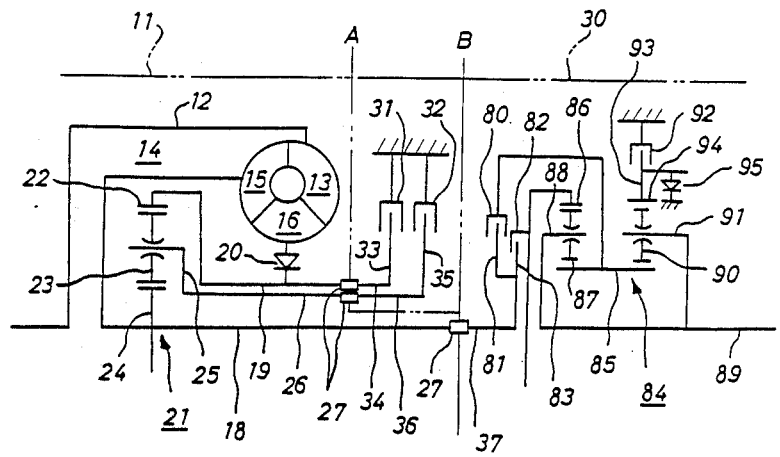

(c) A structure of FIG. 5 may be used. In FIG. 5, a member corresponding to that of FIG. 1 is attached with the same symbol as FIG. 1.

In FIG. 5, a clutch disc 81 of a clutch 80 and a clutch disc 83 of a clutch 82 are fixed to the main shaft 37. The clutch 80 is fixed to a sun gear 85 of a Simpson double planet type planetary gear mechanism 84, and the clutch 82 is fixed to an internal gear 86 of the Simpson double planet type planetary gear mechanism 84. The internal gear 86 meshes with a planetary gear 87, and the planetary gear 87 in turn meshes with the sun gear 85. The planetary gear 87 is rotatably carried by a planetary carrier 88, and the planetary carrier 88 is fixed to an output shaft 89.

The sun gear 85 further meshes with a planetary gear 90. The planetary gear 90 is rotatably carried by a planetary carrier 91, and the planetary carrier is fixed to the output shaft 89. The planetary gear 90 further meshes with an internal gear 94 fixed to a brake disc 93 of a brake 92. The brake 92 is fixed to the housing of the transmission 30, and the brake disc 93 is connected through a one-way clutch 95 to the housing of the transmission 30.

When assembling the transmission system, the already assembled torque converter 11 and the transmission 30 are connected together by using the coupling 27. In this case, the division may be made at all the couplings 27 or at the coupling 27 between the turbine shaft 18 and the main shaft 37. Namely, the torque converter 11 and the transmission 30 can be divided into two halves at the dividing line A or B.

(d) The torque converter 11 may be utilized as a fluid coupling by fabricating it for example into such a structure that the stator wheel 16 is coupled directly to the stator shaft 19 without installing the one-way clutch 20 of FIG. 1 and both the high-speed brake 31 and the low-speed brake 32 are released simultaneously.

(Effect of the invention)

In the three-element torque converter, wherein the turbine wheel 15 adapted to be rotated by the hydraulic power from the pump inpeller 13 and the stator wheel 16 disposed therebetween are installed in the space 14 formed by the housing 12 to which the engine power is inputted and the pump impeller 13 connected to the housing 12, the output side turbine shaft 18 connected to said turbine wheel 15 is disposed at the center, and the cylindrical stator shaft 19 connected to the stator wheel 16 is installed coaxially with the stator shaft 19; the planetary gear mechanism 21 comprising the sun gear 24 fixed to the turbine shaft 18, the planetary gear 23 meshing with the sun gear 24, the internal gear 22 fixed to the stator shaft 19 and meshing with the planetary gear 23, and the planetary carrier 25 which carries the planetary gear 23, is provided in said space 14; and the cylindrical carrier shaft 26 coaxial with the turbine shaft 18 is fixed to the planetary carrier 25. Therefore, the following advantages are obtainable.

(a) The three-element torque converter can exert the following performances. In the low-speed range, it can produce a larger torque ratio than the four-element torque converter to increase the transmitting torque which is apt to be insufficient at the time of low-speed. While, in the high-speed range, it can develop the same characteristic as the ordinary three-element torque converter, i.e. the so-called multi-stage characteristic.

(b) On the other hand, said planetary gear mechanism is installed in the space formed by the housing and the pump impeller, so that the three-element multi-stage torque converter always maintains the multi-stage function regardless of the structure of transmission to be connected.

Therefore, the three-element multi-stage torque converter according to the present invention can be connected to various types of transmission. Namely, the torque converter has large varsatility.

What is claimed is:

1. A three-element multi-stage torque converter, wherein a turbine wheel adapted to be rotated by hydraulic power from a pump impeller and a stator wheel disposed therebetween are installed in a space formed by a housing to which an engine power is inputted and the pump impeller connected to the engine, an input side turbine shaft connected to said turbine wheel is disposed on a center line of said converter and is connected to a main output shaft, and a cylindrical stator shaft connected to the stator wheel is installed coaxially with and around said output side turbine shaft; characterized by that a planetary gear mechanism comprising a sun gear fixed to the turbine shaft, a planetary gear meshing with the sun gear, an internal gear fixed to the stator shaft and meshing with the planetary gear, and a planetary carrier carrying the planetary gear, is provided in said space; and a cylindrical carrier shaft coaxial with and around said turbine shaft is fixed to the planetary carrier.

2. A three-element multi-stage torque converter as set forth in claim 1, in which said stator wheel and the stator shaft are connected together through a one-way clutch which transmits only a reversal torque of the stator wheel.

3. A three-element multi-stage torque converter as set forth in claim 2, in which the stator shaft is equipped with a high-speed brake which can freely lock or release the stator shaft, the carrier shaft is equipped with a low-speed brake which can freely lock or release the carrier shaft, the carrier shaft being freely engaged with of disengaged from an output gear through a first clutch for backward drive, the turbine shaft is freely engaged with of disengaged from the output gear through a second clutch for forward drive, and the turbine shaft is equipped with a backward drive clutch.

4. A three-element multi-stage torque converter as set forth in claim 2, in which the stator shaft is equipped with a high-speed brake which can freely lock or release the stator shaft, the carrier shaft is equipped with a low-speed brake which can freely lock or release the carrier shaft, a main shaft is connected to the turbine shaft, and said main shaft and an output shaft are interconnected through a planetary gear mechanism which is different from said planetary gear mechanism installed in said space.

5. A three-element multi-stage torque converter as set forth in claim 4, in which a sun gear of the planetary gear mechanism connecting the output shaft to the main shaft connected to the turbine shaft is fixed to said main shaft, the internal gear is fixed to the output shaft, the planetary carrier having the planetary gear is equipped with a brake which freely locks or releases the planetary carrier, and said planetary carrier is further freely engaged with or disengaged from the main shaft through a clutch.

6. A three-element multi-stage torque converter as set forth in claim 2, in which the stator shaft is equipped with a high-speed brake which can freely lock or release the stator shaft, the carrier shaft is equipped with a low-speed brake which can freely lock or release the carrier shaft, the main shaft connected to the turbine shaft is provided with a sun gear freely engaged or disengaged through a front clutch and a sun gear freely locked or released by a backward brake, the both sun gears being connected through a Ravigneaux compound gear mechanism to an output shaft, and a carrier of the Ravigneaux compound gear mechanism and the former sun gear are equipped with brakes respectively.

7. A three-element multi-stage torque converter as set forth in claim 2, in which the stator shaft is equipped with a high-speed brake which can freely lock or release the stator shaft, the carrier shaft is equipped with a low-speed brake which can freely lock or release the carrier shaft, and a main shaft connected to the turbine shaft is connected to an output shaft through a clutch and a Simpson double planet type planetary gear mechanism.

* * * * *